United States Patent Office 3,094,647
Patented June 18, 1963

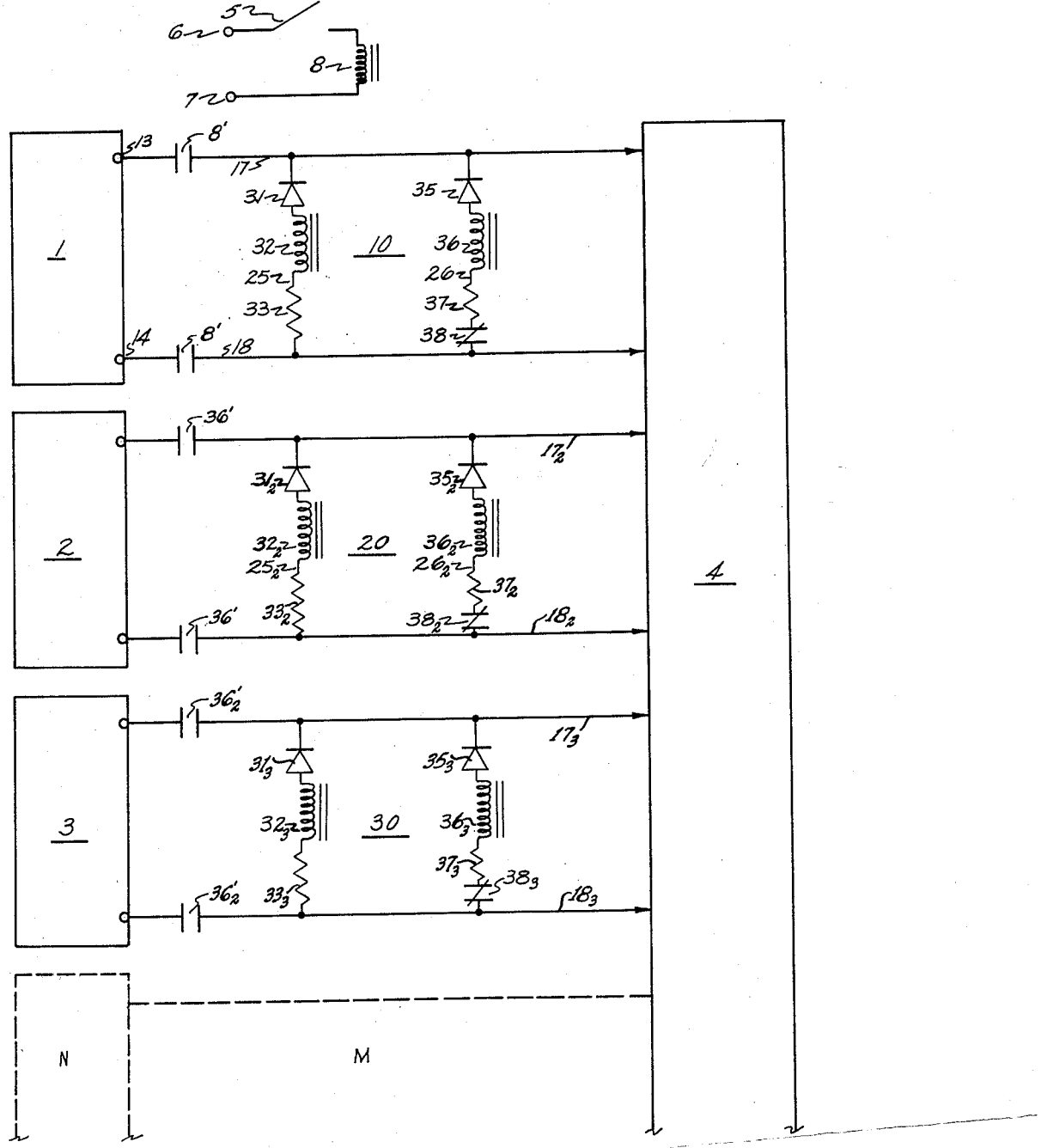

3,094,647
CIRCUIT PROTECTION MEANS
Kenneth S. Ferrin, Sunnyvale, Calif., assignor to General Electric Company, a corporation of New York
Filed June 30, 1961, Ser. No. 121,167
13 Claims. (Cl. 317—31)

This invention pertains to circuits for preventing damage to other electrical circuits, and more particularly, to a protection means for preventing damage caused by undervoltage or overvoltage conditions.

In electrical and electronic circuits it is frequently necessary to require a plurality of power supplies or voltage sources each for providing a different voltage to a utilization circuit. These voltages may be used for relay operation, for bias supplies, as reference voltages, and for many other uses throughout the electrical and electronic circuit. It is also usually necessary to insure that certain voltages are applied to the electrical or electronic circuit (utilization circuit) before the remainder of the voltages are applied; similarly, in the event of a failure or shut-down, it is also necessary that certain voltages be removed from the utilization circuit before the remainder of the supply voltages. Accordingly, the prior art has provided complex sequencing mechanisms for applying various voltages in sequence, and has usually provided a complex system of delays to insure that certain voltages are not removed from the circuit before other voltages.

In addition to the problem of sequencing the application of power supply voltages to a utilization circuit, overvoltage and undervoltage protection must be afforded to each of the power supplies individually; accordingly, the prior art has provided complex systems for sensing and detecting the existence of overvoltage or undervoltage conditions in the individual power supply, and for providing appropriate remedial action.

Accordingly, it is an object of the present invention to provide an improved circuit for sequencing the application of voltages to a utilization circuit.

It is also an object of the present invention to provide an overvoltage protection circuit.

It is a further object of the present invention to provide an undervoltage protection circuit.

It is still a further object of the present invention to provide a protection circuit for sequencing the application of voltages to a utilization circuit while providing undervoltage and overvoltage protection to the utilization circuit for each of the voltage sources.

Further objects and advantages of the present invention become apparent as the description thereof proceeds.

Briefly, in accordance with one embodiment of the present invention, a plurality of protection circuits are provided, one for each voltage source and each connected to a utilization circuit, for sequencing the application of voltages to the utilization circuit. Each protection circuit includes a pair of normally open contacts in series therewith which are closed by the actuation of a relay coil in another of the protection circuits.

A pair of electrical conductors are connected to the normally open contacts, and are provided with two series circuits joining the two conductors. The first series circuit contains a zener diode and a relay coil in series; the zener diode has a zener voltage equal to the maximum permissible voltage of the respective voltage supply. The second series circuit contains a zener diode, a relay coil, and a pair of normally closed contacts. The zener voltage of the zener diode in the second series circuit is chosen to be equal to the minimum voltage permissible for the respective power supply. The normally closed contacts in the second series circuit may be opened by the energization of the relay coil in the first series circuit; similarly, the normally open contacts in another of the protective circuits are closed by the energization of the relay coil of the second series circuit. Thus, when voltage is applied to the protective circuit, and the voltage is within the desired voltage range, the second series circuit provides a conductive path between the electrical conductors, and the relay coil in the circuit is energized to thereby close the normally open contacts of another protective circuit. If the voltage drops below the zener voltage of the zener diode in the second series circuit, the corresponding relay coil is deenergized, and the normally opened contacts of another of the protective circuits are returned to their open position thereby disconnecting the corresponding voltage supply from the utilization circuit. Similarly, if the voltage between the conductors exceeds the zener voltage of the zener diode in the first series circuit, the relay coil in series therewith opens the normally closed contacts in series with the second series circuit, and the relay coil in the second series circuit is thus de-energized, returning the normally open contacts of another protective circuit to their open position.

The invention, both as to its organization and operation together with further objects and advantages thereof, may best be understood by reference to the following description taken in connection with the accompanying drawing in which a schematic circuit is shown illustrating an embodiment of the present invention.

Referring to the drawing, voltage sources 1, 2, 3, . . . N are shown for supplying respective voltages to a utilization circuit 4. The power supplies are joined to the utilization circuit through protective circuits 10, 20, 30, . . . M, respectively. The protective circuit 10 is provided with a pair of normally open contacts 8', each having one contact thereof connected to an output terminal 13 and 14, respectively, of the voltage source 1. The other contacts of the pairs of contacts 8' are connected to conductors 17 and 18, respectively. Conductors 17 and 18 are applied to the utilization circuit 4 to provide the necessary voltage from the voltage source 1.

Referring to protective circuit 10, two series circuits 25 and 26 are connected between electrical conductors 17 and 18. The first series circuit 25 includes a zener diode 31, a relay coil 32, and a resistor 33. The zener diode 31 is chosen to have a zener voltage equal to the maximum permissible voltage to be supplied by the voltage source 1. The second series circuit 26 includes a zener diode 35, a relay coil 36, a resistor 37, and a pair of normally closed contacts 38. The zener diode 35 is chosen to have a zener voltage equal to the minimum permissible voltage to be supplied by the voltage source 1. The normally closed contacts 38 are opened by the energization of the relay coil 32 in the first series circuit 25. The relay coil 36, when energized, operates the normally open contacts in series with the electrical conductors of another protective circuit in a manner to be explained more fully hereinafter.

Protectice circuits 20, 30, . . . M are identical with the protective circuit 10. Thus, the pairs of normally open contacts 36' of protective circuit 20 are closed by the energization of the relay coil 36 of the protective circuit 10. Similarly, the pairs of normally open contacts 36$_2$' of protective circuit 30 are closed by the energization of the relay coil 36$_2$ of protective circuit 20. The pair of normally closed contacts 38 in the second series circuit 26 of each protective circuit is openable upon energization of the relay coil 32 of the first series circuit 25 of the respective circuit. Thus, energization of the relay coil 32 in protective circuit 10 will open the normally closed contacts 38 of protective circuit 10; energization of the relay coil $32_2$ of protective circuit 20 will open the normally closed contacts $38_2$ of protective circuit 20; etc. To provide a means for initiating the application of the voltages from the voltage sources 1, 2, 3, . . . N to the utilization circuit 4, the manual switch 5, connected to a suitable potential source (not shown) through terminals 6 and 7, may be provided to energize a relay coil 8. The relay coil 8, when energized, closes normally opened contacts 8' of the protective circuit 10, and thus initiates a sequencing action for the application of the voltages from the voltage sources to the utilization circuit 4.

The operation of the embodiment shown in the drawing is as follows. Assuming that the voltage supplied by the voltage source 1 is to be applied to the utilization circuit 4, first, the voltage supplied by the voltage source 2, second, and the voltage supplied by the voltage source 3, third, etc., the circuit of the present invention provides the proper sequenching by closing the manual switch 5 thus energizing the relay coil 8. The energization of relay coil 8 closes normally open contacts 8' of the protective circuit 10, thereby applying the voltage from voltage source 1 to the utilization circuit 4. If the voltage thus applied is under the minimum permissive voltage for the utilization circuit 4, zener diode 35 will prevent conduction in the second series circuit 26; thus, relay coil 36 will not become energized, and the normally open contacts 36', $36_2$' of protective circuits 20, 30, . . . M will remain open, and the voltages from voltage sources 2, 3, . . . N will not be applied to the utilization circuit 4. If the voltage applied by the voltage source 1 exceeds the maximum permissive voltage, zener diode 31 will permit conduction through the first series circuit 25, and thus will permit energization of the relay coil 32. The relay coil 32, when energized, opens the normally closed contacts 38 of the second series circuit 26. When the second series circuit is opened-circuited, relay coil 36 is de-energized, and the normally open contacts 36', $36_2$', of protective circuits 20, 30, . . . M remain in, or are returned to, their normally open states. If the voltage applied by the voltage source 1 is above the minimum, and below the maximum permissive voltage, zener diode 35 will permit conduction in the series circuit 26, and zener diode 31 will prevent conduction in the first series circuit 25; accordingly, the normally open contacts 36' of the protective circuit 20 will be closed, and the voltage from the second voltage source 2 will be applied to the utilization circuit 4.

If the voltage from the second voltage source is under the permissive voltage for that source, zener diode $35_2$ of protective circuit 20 will prevent energization of relay coil $36_2$ of protective circuit 20, and will thus inhibit the closing of normally open contacts $36_2$' of protective circuit 30. Similarly, if the applied voltage from voltage source 2 exceeds the maximum permissible voltage, zener diode $31_2$ of protective circuit 20 will permit energization of the relay coil $32_2$ and thus will cause the opening of the normally closed contacts $38_2$ of protective circuit 20. When the normally closed contacts $38_2$ of protective circuit 20 are opened, relay $36_2$ of protective circuit 20 is de-energized, and the normally open contacts $36_2$' of protective circuit 30 remain open, thus preventing the application of the voltage from voltage source 3 to the utilization circuit 4. If the voltage from the voltage source 2 is of the proper or permissive value, normally open contacts $36_2$' of the protection circuit 30 will be closed, and protection circuit 30 will then provide a similar overvoltage and undervoltage protection to the utilization circuit 4 for the voltage supplied by the voltage source 3.

If all of the voltages from the voltage sources 1, 2, 3, . . . N are successively applied to the utilization circuit 4, each protective circuit will continue to permit the succeeding protective circuit to supply the voltage from the succeeding voltage source to the utilization circuit. If the voltages from any of the voltage sources exceeds the maximum permissible voltage, or fails to maintain a voltage above the minimum permissible voltage, all succeeding voltage sources would be disconnected from the utilization circuit. For example, if the circuit shown in the drawing is operating properly, and the voltage from the voltage source 2 should suddenly exceed the maximum permissible voltage level for that source, the zener diode $31_2$ of protective circuit 20 would permit the energization of the corresponding relay coil $32_2$, and thus would cause the opening of the normally closed contacts $38_2$ of the protective circuit 20. With normally closed contacts $38_2$ open, all succeeding voltage sources would become disconnected from the utilization circuit 4.

It may be convenient to connect a suitable indicating means such as, for example an indicator lamp (not shown), across the conductors of the protective circuit; in this manner, the condition of each protective circuit may be observed, and those protective circuits which have been disconnected from the respective voltage source by a preceding protective circuit may be determined by the condition of the indicating means. The resistors 33 and 37 of each protective circuit serve a current limiting function, and may be removed if the duty cycle of circuit protective means is short. One of the pair of normally open contacts 8', 36', $36_2$', and conductors 18, $18_2$, $18_3$, may be eliminated in those instances where one side of the voltage is grounded, the series circuits then being grounded at the low voltage side thereof.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by letters patent of the United States is:

1. Circuit protection means including a plurality of protective circuits each comprising, a pair of input terminals, a first and a second pair of normally open contacts each pair having one contact thereof connected to one of said input terminals, a pair of electric conductors each connected to the other contact of one of said pairs of normally open contacts, respectively, a first series circuit connected between said conductors including a zener diode and a relay coil, said zener diodes having a zener voltage equal to a predetermined maximum voltage, a second series circuit connected between said conductors including a zener diode, a relay coil, and a pair of normally closed contacts, said zener diode of said second series circuit having a zener voltage equal to a predetermined minimum voltage, said normally closed contacts adapted to open when said relay coil of said first series circuit is energized, said first and second pairs of normally open contacts adapted to close when the relay coil of the second series circuit of another of said protective circuits is energized, said circuit protection means also including energizable means for closing the normally open contacts of one of said plurality of protective circuits.

2. Circuit protection means including a plurality of protective circuits each comprising, a pair of input terminals, a first and a second pair of normally open contacts each pair having one contact thereof connected to one of said input terminals, a pair of electrical conductors each connected to the other contact of one of said pairs of normally open contacts, respectively, a series circuit connected between said conductors including a zener diode and a relay coil, said zener diode having a zener voltage equal to a predetermined maximum voltage, means connected between said conductors responsive to voltages above a predetermined minimum voltage between said conductors for closing said first and second pairs of normally open contacts of another of said protective circuits, said means also responsive to the energization of said relay coil for disabling said means to prevent the closing of said first and second pairs of normally open contacts of another of said protective circuits, said circuit protection means also including energizable means for closing the normally open contacts of one of said plurality of protective circuits.

3. Circuit protection means including a plurality of protective circuits each comprising, a pair of input terminals, a first and a second pair of normally open contacts each pair having one contact thereof connected to one of said input terminals, a pair of electrical conductors each connected to the other contact of one of said pairs of normally open contacts, respectively, first means connected between said conductors responsive to voltages above a predetermined minimum voltage between said conductors for closing said first and second pairs of normally open contacts of another of said protective circuits, and second means connected between said conductors responsive to voltages above a predetermined maximum voltage between said conductors for disabling said first means to prevent the closing of said first and second pairs of normally open contacts of another of said protective circuits, said circuit protection means also including energizable means for closing the normally open contacts of one of said plurality of protective circuits.

4. Circuit protection means including a plurality of protective circuits each comprising, a pair of input terminals, first and second pairs of normally open contacts each pair having one contact thereof connected to one of said input terminals, a pair of electrical conductors each connected to the other contact of one of said pairs of normally open contacts, respectively, a series circuit connected between said conductors including a zener diode and a relay coil, said zener diode having a zener voltage equal to a predetermined maximum voltage and poled to inhibit current flow in said series circuit when the voltage between said conductors is less than said maximum voltage, and means connected between said conductors responsive to voltages above a predetermined minimum voltage between said conductors for closing said first and second pairs of normally open contacts of another of said protective circuits, said means also responsive to the energization of said relay coil for disabling said means to prevent the closing of said first and second pairs of normally open contacts of another of said protective circuits, said circuit protection means also including energizable means for closing the normally open contacts of one of said plurality of protective circuits.

5. In combination, a utilization circuit, a plurality of voltage sources each adapted to supply a given voltage to said utilization circuit, a plurality of protective circuits each connecting a different one of said voltage sources to said utilization circuit, each of said protective circuits comprising, first and second input terminals, means connecting said input terminals to one of said voltage sources, first and second pairs of normally open contacts each pair having one contact thereof connected to one of said input terminals, a pair of electrical conductors each connected to the other contact of one of said pairs of normally open contacts, respectively, a first series circuit connected between said conductors including a zener diode and a relay coil, said zener diode having a zener voltage equal to a predetermined maximum voltage, a second series circuit connected between said conductors including a zener diode, a relay coil, and a pair of normally closed contacts, said zener diode of said second series circuit having a zener voltage equal to a predetermined minimum voltage, said normally closed contacts adapted to open when said relay coil of said first series circuit is energized, said first and second pairs of normally open contacts adapted to close when the relay coil of the second series circuit of another of said protective circuits is energized, and energizable means for closing the normally open contacts of one of said plurality of protective circuits.

6. In combination, a utilization circuit, a plurality of voltage sources each adapted to supply a given voltage to said utilization circuit, a plurality of protective circuits each connecting a different one of said voltage sources to said utilization circuit, each of said protective circuits comprising, first and second input terminals, means connecting said input terminals to one of said voltage sources, first and second pairs of normally open contacts each pair having one contact thereof connected to one of said input terminals, a pair of electrical conductors each connected to the other contact of one of said pairs of normally open contacts, respectively, a series circuit connected between said conductors including a zener diode and a relay coil, said zener diode having a zener voltage equal to a predetermined maximum voltage, means connected between said conductors responsive to voltages above a predetermined minimum voltage between said conductors for closing said first and second pairs of normally open contacts from another of said protective circuits, said means also responsive to the energization of said relay coil for disabling said means to prevent the closing of said first and second pairs of normally open contacts of another of said protective circuits, and energizable means for closing the normally open contacts of one of said plurality of protective circuits.

7. In combination, a utilization circuit, a plurality of voltage sources each adapted to supply a given voltage to said utilization circuit, a plurality of protective circuits each connecting a different one of said voltage sources to said utilization circuit, each of said protective circuits comprising, a first and a second input terminal, means connecting said input terminals to one of said voltage sources, first and second pairs of normally open contacts each pair having one contact thereof connected to one of said input terminals, a pair of electrical conductors each connected to the other contact of one of said pairs of normally open contacts, respectively, first means connected between said conductors responsive to voltages above a predetermined minimum voltage between said conductors for closing said first and second pairs of normally open contacts of another of said protective circuits, second means connected between said conductors responsive to voltages above a predetermined maximum voltage between said conductors for disabling said first means to prevent the closing of said first and second pairs of normally open contacts of another of said protective circuits, and energizable means for closing the normally open contacts of one of said plurality of protective circuits.

8. In combination, a utilization circuit, a plurality of voltage sources each adapted to supply a given voltage to said utilization circuit, a plurality of protective circuits each connecting a different one of said voltage sources to said utilization circuit, each of said protective circuits comprising, a first and a second input terminal, means connecting said input terminals to one of said voltage sources, first and second pairs of normally open contacts each pair having one contact thereof connected to one of said input terminals, a pair of electrical conductors each connected to the other contact of one of said pairs of normally open contacts, respectively, a series circuit connected between said conductors including a zener diode and a relay coil, said zener diode having a zener voltage equal to a predetermined maximum voltage and poled to inhibit current flow in said series circuit when the voltage between said conductors is less than said maximum voltage, means connected between said conductors responsive to voltages above a predetermined minimum voltage between said conductors for closing said first and second pairs of normally open contacts of another of said protective circuits, said means also responsive to the energization of said relay coil for disabling said means to prevent the closing of said first and second pairs of normally open contacts of another of said protective circuits, and energizable means for closing the normally open contacts of one of said plurality of protective circuits.

9. In combination, a utilization circuit, a plurality of voltage sources each adapted to supply a given voltage to said utilization circuit, a plurality of protective circuits each connecting a different one of said voltage sources to said utilization circuit, each of said protective circuits comprising, a pair of input terminals, a pair of normally open contacts having one contact thereof connected to one of said input terminals, a first electrical conductor connected to the other of said input terminals, a second electrical conductor connected to the other contact of said pair of normally open contacts, a first series circuit connected between said conductors including a zener diode and a relay coil, said zener diode having a zener voltage equal to a predetermined maximum voltage, a second series circuit connected between said conductors including a zener diode, a relay coil, and a pair of normally closed contacts, said zener diode of said second series circuit having a zener voltage equal to a predetermined minimum voltage, said normally closed contacts adapted to open when said relay coil of said first series circuit is energized, said pair of normally open contacts adapted to close when the relay coil of the second series circuit of another of said protective circuits is energized, and energizable means for closing the normally open contacts of one of said plurality of protective circuits.

10. In combination, a utilization circuit, a plurality of voltage sources each adapted to supply a given voltage to said utilization circuit, a plurality of protective circuits each connecting a different one of said voltage sources to said utilization circuit, each of said protective circuits comprising, a pair of input terminals, a pair of normally open contacts having one contact thereof connected to one of said input terminals, a first electrical conductor connected to the other of said input terminals, a second electrical conductor connected to the other contact of said pair of normally open contacts, first means connected between said conductors responsive to voltages above a predetermined minimum voltage between said conductors for closing said pair of normally open contacts of another of said protective circuits, second means connected between said conductors responsive to voltages above a predetermined maximum voltage between said conductors for disabling said first means to prevent the closing of said pair of normally open contacts of another of said protective circuits, and energizable means for closing the normally open contacts of one of said plurality of protective circuits.

11. Circuit protection means including a plurality of protective circuits each comprising, a pair of input terminals, a pair of normally open contacts having one contact thereof connected to one of said input terminals, a first electrical conductor connected to the other of said input terminals, a second electrical conductor connected to the other contact of said pair of normally open contacts, a first series circuit connected between said conductors including a zener diode and a relay coil, said zener diode having a zener voltage equal to a predetermined maximum voltage, a second series circuit connected between said conductors including a zener diode, a relay coil, and a pair of normaly closed contacts, said zener diode of said second series circuit having a zener voltage equal to a predetermined minimum voltage, said normally closed contacts adapted to open when said relay coil of said first series circuit is energized, said normally opened contacts adapted to close when the relay coil of the second series circuit of another of said protective circuits is energized, said circuit protection means also including energizable means for closing the normally open contacts of one of said plurality of protective circuits.

12. Circuit protection means including a plurality of protective circuits each comprising, a pair of input terminals, a pair of normally open contacts having one contact thereof connected to one of said input terminals, a first electrical conductor connected to the other of said input terminals, a second electrical conductor connected to the other contact of said pair of normally open contacts, first means connected between said conductors responsive to voltages above a predetermined minimum voltage between said conductors for closing said pair of normally open contacts of another of said protective circuits, second means connected between said conductors responsive to voltages above a predetermined voltage between said conductors for disabling said first means to prevent the closing of said pair of normally open contacts of another of said protective circuits, said circuit protection means also including energizable means for closing the normally open contacts of one of said plurality of protective circuits.

13. Circuit protection means including a plurality of protective circuits each comprising, a pair of input terminals, a pair of normally open contacts having one contact thereof connected to one of said input terminals, a pair of electric conductors, one of said conductors connected to the other contact of said pair of normally open contacts, the other of said conductors connected to the other of said pair of input terminals, a first series circuit connected between said conductors including a zener diode and a relay coil, said zener diodes having a zener voltage equal to a predetermined maximum voltage, a second series circuit connected between said conductors including a zener diode, a relay coil, and a pair of normally closed contacts, said zener diode of said second series circuit having a zener voltage equal to a predetermined minimum voltage, said normally closed contacts adapted to open when said relay coil of said first series circuit is energized, said normally open contacts adapted to close when the relay coil of the second series circuit of another of said protective circuits is energized, said circuit protection means also including energizable means for closing the normally open contacts of one of said plurality of protective circuits.

No references cited.